United States Patent
Murty et al.

(10) Patent No.: US 8,318,996 B2
(45) Date of Patent: Nov. 27, 2012

(54) SYSTEMS AND METHODS FOR TREATING HYDROGEN RECYCLE GAS IN A PROCESS FOR CONVERTING BIORENEWABLE FEEDSTOCK INTO RENEWABLE FUELS AND CHEMICALS

(75) Inventors: Vedula Kasipati Murty, Willowbrook, IL (US); Donald Eizenga, Elk Grove Village, IL (US); Charles P. Luebke, Mount Prospect, IL (US); Samarjit Singh, Glendale Heights, IL (US)

(73) Assignee: UOP LLC, Des Plaines, IL (US)

( * ) Notice: Subject to any disclaimer, the term of this patent is extended or adjusted under 35 U.S.C. 154(b) by 100 days.

(21) Appl. No.: 12/872,762

(22) Filed: Aug. 31, 2010

(65) Prior Publication Data

US 2012/0047793 A1 Mar. 1, 2012

(51) Int. Cl.
*C07C 1/00* (2006.01)
*C10L 5/00* (2006.01)
(52) U.S. Cl. .......................... 585/240; 585/242; 44/605
(58) Field of Classification Search .................. 585/240, 585/242; 44/605
See application file for complete search history.

(56) References Cited

U.S. PATENT DOCUMENTS

| | | | |
|---|---|---|---|
| 3,516,924 A * | 6/1970 | Forbes | 208/65 |
| 4,743,356 A * | 5/1988 | Soderberg et al. | 208/101 |
| 4,808,289 A | 2/1989 | McDaniel et al. | |
| 4,946,068 A | 8/1990 | Erickson et al. | |
| 4,990,241 A | 2/1991 | Buttke et al. | |
| 5,013,427 A | 5/1991 | Mosby et al. | |
| 5,238,555 A | 8/1993 | Pappas et al. | |
| 5,705,722 A * | 1/1998 | Monnier et al. | 585/240 |
| 5,817,288 A * | 10/1998 | Bauer et al. | 423/481 |
| 5,856,607 A | 1/1999 | Kim | |
| 7,232,935 B2 * | 6/2007 | Jakkula et al. | 585/240 |
| 7,288,685 B2 | 10/2007 | Marker | |
| 7,511,181 B2 | 3/2009 | Petri et al. | |
| 7,960,597 B2 * | 6/2011 | Miller | 585/240 |
| 7,982,078 B2 * | 7/2011 | Brady et al. | 585/240 |
| 7,999,143 B2 * | 8/2011 | Marker et al. | 585/240 |
| 2006/0264684 A1 * | 11/2006 | Petri et al. | 585/250 |
| 2009/0321311 A1 | 12/2009 | Marker et al. | |
| 2010/0076238 A1 | 3/2010 | Brandvold et al. | |
| 2010/0133144 A1 | 6/2010 | Kokayeff et al. | |
| 2010/0137662 A1 | 6/2010 | Sechrist et al. | |

* cited by examiner

*Primary Examiner* — Nina Bhat
(74) *Attorney, Agent, or Firm* — David J Piasecki

(57) ABSTRACT

Systems and methods for treating hydrogen recycle gas in a process for converting biorenewable feedstock into green diesel fuel are provided. Sponge oil is provided. Hydrogen recycle gas produced during the process is contacted with the sponge oil. The sponge oil and hydrogen recycle gas are contacted in a contact drum and propane and other light hydrocarbons from the hydrogen recycle gas are absorbed into the sponge oil producing purified recycle gas and propane-rich sponge oil. The purified recycle gas is recycled into the process and the propane-rich sponge oil is fractionated to recover propane. The sponge oil may be sour sponge oil to also sulfide a deoxygenation catalyst used in the process.

15 Claims, 3 Drawing Sheets

SYSTEMS AND METHODS FOR TREATING HYDROGEN RECYCLE GAS IN A PROCESS FOR CONVERTING BIORENEWABLE FEEDSTOCK INTO RENEWABLE FUELS AND CHEMICALS

FIELD OF THE INVENTION

The present invention generally relates to systems and methods for producing renewable fuels and chemicals from biorenewable sources, and more particularly relates to systems and methods for treating hydrogen recycle gas in a process for converting biorenewable feedstock into renewable fuels and chemicals.

DESCRIPTION OF RELATED ART

As the worldwide demand for fuel increases, there is increasing interest in sources other than crude oil for producing diesel fuel. One source of interest is biorenewable sources, such as vegetable oils and animal fats. A conventional catalytic hydroprocessing process is known for converting a biorenewable feedstock into green diesel fuel that may be used as a substitute for the diesel fuel produced from crude oil. The process also supports the possible co-production of propane and other light hydrocarbons, as well as naphtha or green jet fuel. As used herein, the terms "green diesel fuel" and "green jet fuel" refer to fuel produced from biorenewable sources, in contrast to those produced from crude oil. When blended into an existing petroleum diesel pool, the high cetane and low density of green diesel fuel can enhance the pool's performance characteristics and increase the diesel pool to include both the petroleum diesel and the green diesel. In addition, the properties of the green diesel fuel substantially eliminate the need for modifications to conventional automobile power trains, fuel pumps, and fuel distribution networks to enable use of the green diesel fuel.

To produce the green diesel fuel, the biorenewable feedstock is combined with hydrogen, brought to reaction temperature, and is then sent to a reactor where the biorenewable feedstock is converted in the presence of a deoxygenation catalyst into a reaction product. The reaction product comprises a liquid portion and a gaseous portion. The liquid portion comprises a hydrocarbon fraction containing n-paraffins. Although this hydrocarbon fraction is useful as a diesel fuel, it will have poor cold flow properties. To improve the cold flow properties of the hydrocarbon fraction, the reaction product may be contacted with an isomerization catalyst under isomerization conditions to at least partially isomerize the n-paraffins to iso-paraffins. Whether isomerization is carried out or not, the liquid portion is separated from the gaseous portion at a high temperature, then cooled, re-heated, and sent to a fractionation unit to produce the green diesel fuel. The process is typically performed in a discrete unit in a refinery for the production of the green diesel fuel.

The gaseous portion comprises predominantly unreacted hydrogen, $CO_2$, and propane and other light hydrocarbons which are generated during the process. As used herein, the term "light hydrocarbons" refers to $C_1$-$C_4$ hydrocarbons, for example, methanes, ethanes, propanes, and butanes. The gaseous portion is treated to remove the $CO_2$ to produce hydrogen recycle gas. The buildup of propane and other light hydrocarbons in the hydrogen recycle gas reduces the purity thereof, negatively impacting the hydroprocessing of the biorenewable feedstock when the hydrogen recycle gas is recycled to mix with fresh feedstock and recycle liquid.

It is common practice to vent or purge a portion of the hydrogen recycle gas in order to remove at least a portion of the light hydrocarbons from the system. The hydrogen lost in the purge is made up with fresh hydrogen. The fresh hydrogen, usually made by reforming a natural gas, is fed to the system to replace the lost hydrogen (hereinafter referred to as "makeup hydrogen gas"). However, this hydrogen purge is costly because of the loss of hydrogen and thus the need for fresh hydrogen. At least a portion of the light hydrocarbons may also be removed in the conventional process by using the green diesel fuel itself as a sponge to carry them over into the fractionation section where they are removed and possibly recovered. However, energy is wasted and the heat exchanger area increased as the liquid portion must be cooled down and then re-heated to remove them.

Accordingly, it is desirable to provide an improved system and method for treating the hydrogen recycle gas to remove and recover light hydrocarbons therefrom, thereby reducing the need for makeup hydrogen gas and saving energy. It is also desired to sulfide the deoxygenation catalyst at the same time as the hydrogen recycle gas is being treated. Furthermore, other desirable features and characteristics of the present invention will become apparent from the subsequent detailed description of the invention and the appended claims, taken in conjunction with the accompanying drawings and this background of the invention.

SUMMARY OF THE INVENTION

Methods are provided for treating hydrogen recycle gas in a process for converting biorenewable feedstock into green diesel fuel. In accordance with one exemplary embodiment, the method comprises providing sponge oil and contacting the hydrogen recycle gas with the sponge oil.

Methods are provided for treating hydrogen recycle gas in a process for converting biorenewable feedstock into green diesel fuel, in accordance with yet another exemplary embodiment of the present invention. The method comprises removing light hydrocarbons from the hydrogen recycle gas by contacting the hydrogen recycle gas with a sponge oil. The light hydrocarbons are absorbed in the sponge oil to produce purified recycle gas and propane-rich sponge oil. The light hydrocarbons are separated from the propane-rich sponge oil. The light hydrocarbons are recovered.

Systems are provided for converting biorenewable feedstock into green diesel fuel, in accordance with an exemplary embodiment. The system comprises a treating reactor configured to convert biorenewable feedstock into a reaction product. A separator is configured to separate the reaction product into a liquid product comprising a hydrocarbon fraction and hydrogen recycle gas. A contact drum is configured to contact sponge oil with the hydrogen recycle gas to produce purified recycle gas and a propane-rich sponge oil.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments of the present invention are directed to a system and method for treating hydrogen recycle gas in a process to convert biorenewable feedstock into a green diesel fuel. The process may also be designed to produce co-products, such as propane and other light hydrocarbons as well as green jet fuel or naphtha. As noted previously, the term "light hydrocarbons" refers to $C_1$-$C_4$ hydrocarbons, for example, methanes, ethanes, propanes, and butanes. The process uses hydrogen gas in a treating reactor of the system to hydrogenate the olefinic or unsaturated portions of the n-paraffinic chains in the biorenewable feedstock in the presence of a deoxygenation catalyst to produce the green diesel fuel and the hydrogen recycle gas. The hydrogen recycle gas contains propane and other light hydrocarbons generated during the process. The hydrogen recycle gas is treated to remove at least a portion of the propane and other light hydrocarbons therefrom, producing purified recycle gas and, optionally, to sulfide the deoxygenation catalyst as hereinafter described. The purified recycle gas is recycled for use as at least a portion of the hydrogen gas. Fresh makeup hydrogen gas is used at start-up. As used herein, "purified recycle gas" comprises predominantly hydrogen. The process to convert the biorenewable feedstock into a green diesel fuel is known as a hydroprocessing process, performed in a hydroprocessing system.

Figure 1:
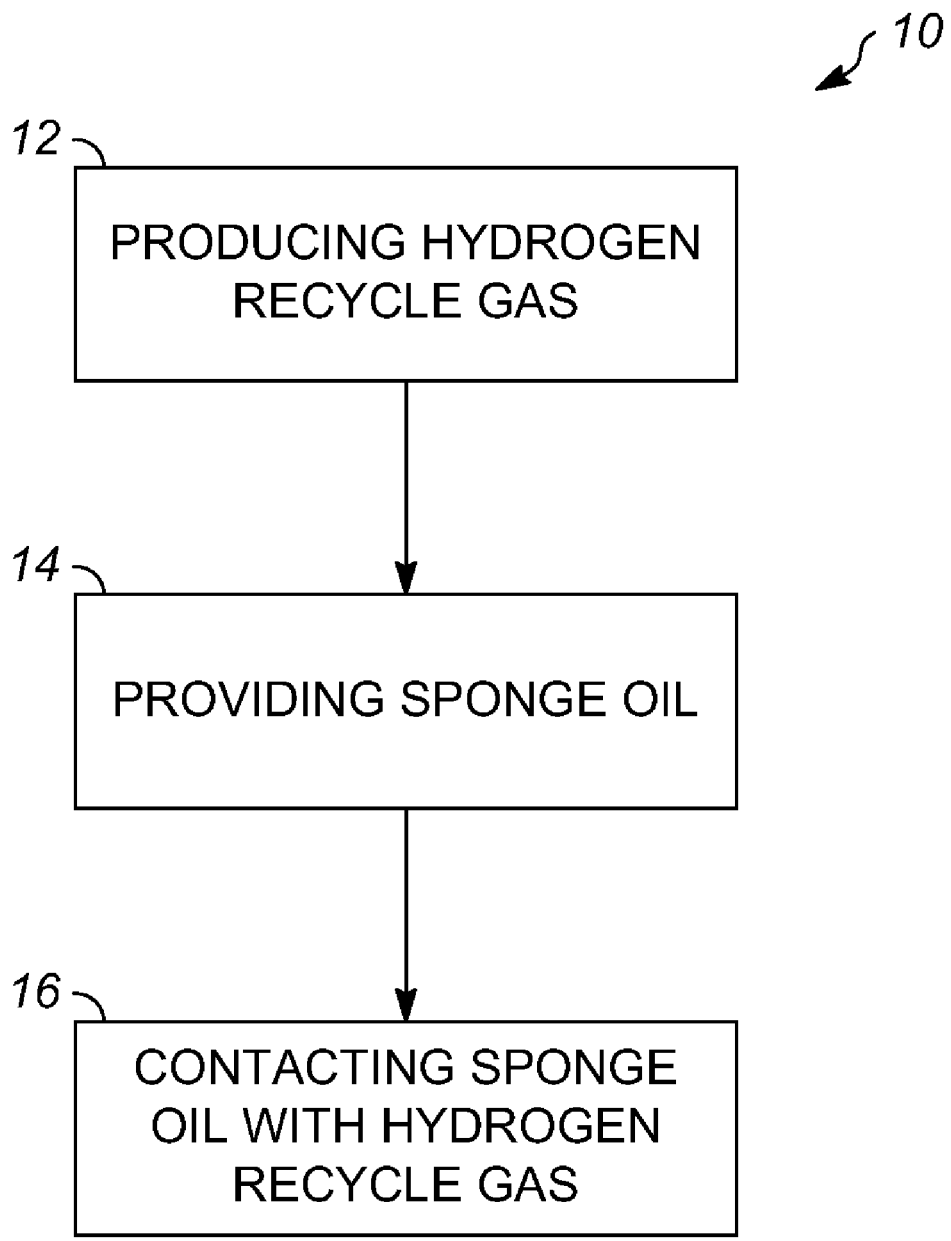
FIG. 1 is a flow diagram of a method for treating hydrogen recycle gas in a process for converting biorenewable feedstock into green diesel fuel, according to exemplary embodiments of the present invention.

As shown in FIG. 1, in accordance with an exemplary embodiment, a method 10 for treating hydrogen recycle gas begins by producing hydrogen recycle gas in a process for converting biorenewable feedstock into a green diesel fuel (step 12). Referring to exemplary systems 100 and 200 illustrated respectively in FIGS. 2 and 3, where like numerals represent like elements in the figures, a feed transfer pump (not shown) brings fresh biorenewable feedstock 112 into a feed surge drum 114 via a feed filter (not shown), where particulate matter is removed. A variety of different biorenewable feedstocks may be converted into green diesel fuel and co-products. These include conventional vegetable oils, animal fats, and second generation oils such as jatropha, camelina, and algal oils. The biorenewable feedstocks that can be used include any of those that comprise primarily triglycerides and Free Fatty Acids (FFA). These compounds contain n-paraffin chains having 10-22 carbon atoms. The n-paraffin chains in the triglycerides or FFAs can be mono, di, or poly-unsaturated. The biorenewable feedstock may be pretreated to remove contaminants as well known in the art.

The feedstock 112 flows from the feed surge drum via a charge pump 116 and mixes with hydrogen gas (fresh makeup hydrogen gas 143 at start-up and purified recycle gas 120, with or without fresh hydrogen after start-up) and recycle oil 122, to produce a combined feed 124. The fresh feedstock 112 may be heated in a feed gas exchanger 125 before mixing with the hydrogen gas. The combined feed 124 is heated in a combined feed exchanger 128 and flows to a combined feed treating heater 130 where additional heat is provided before entering a treating reactor 118.

In the treating reactor 118, the combined feed 124 is contacted with a deoxygenation catalyst at hydrogenation conditions to hydrogenate the olefinic or unsaturated portions of the n-paraffinic chains in the feedstock. Deoxygenation catalysts and conditions are well known in the art. The deoxygenation catalysts are also capable of catalyzing decarboxylation and/or hydrodeoxygenation of the feedstock to remove oxygen therefrom. Decarboxylation and hydrodeoxygenation are herein collectively referred to as deoxygenation reactions. Deoxygenation conditions are well known in the art.

Figure 2:
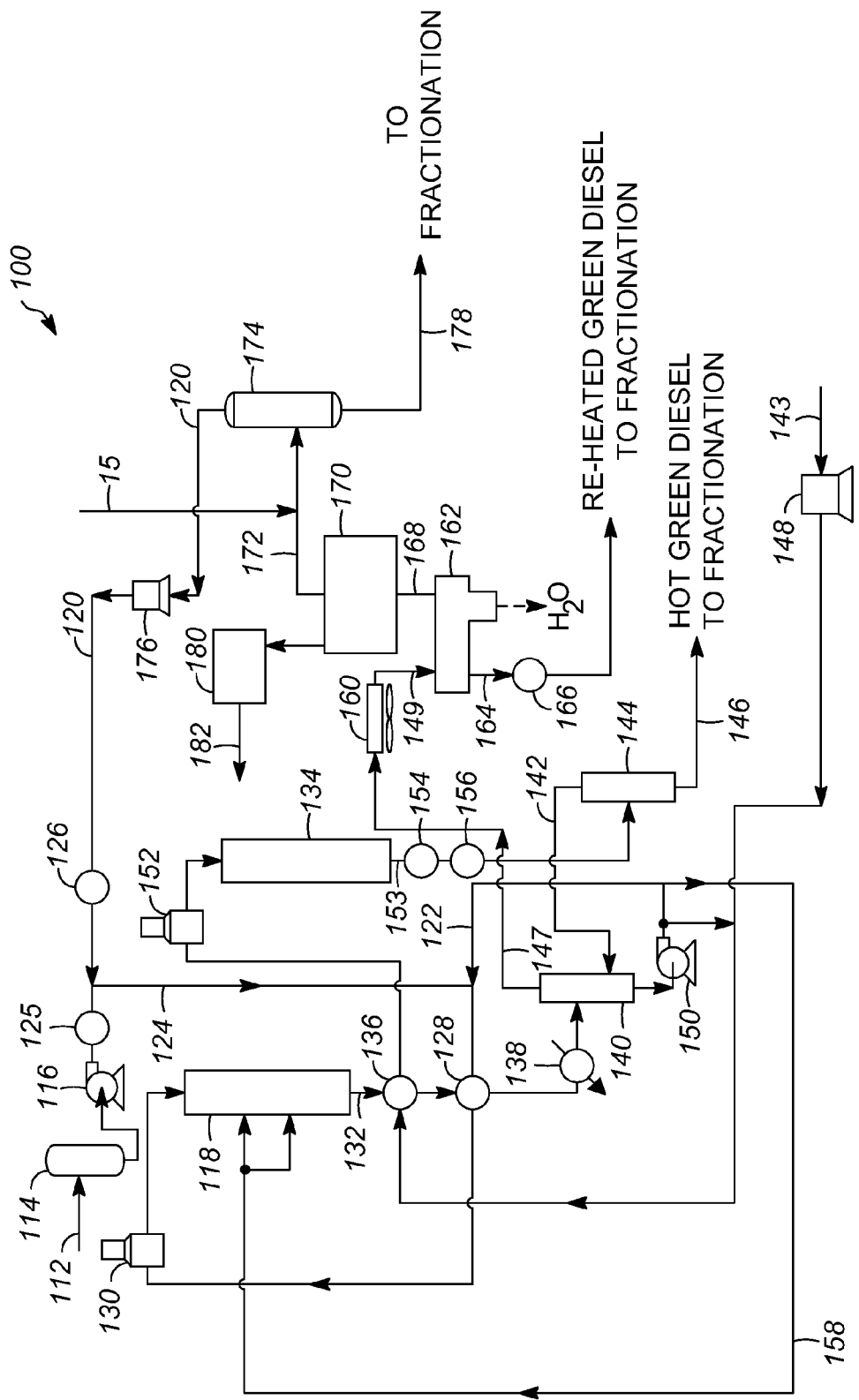
FIG. 2 is a schematic diagram of a system for treating the hydrogen recycle gas in the process for converting the biorenewable feedstock into green diesel fuel, according to an exemplary embodiment of the present invention.
Figure 3:
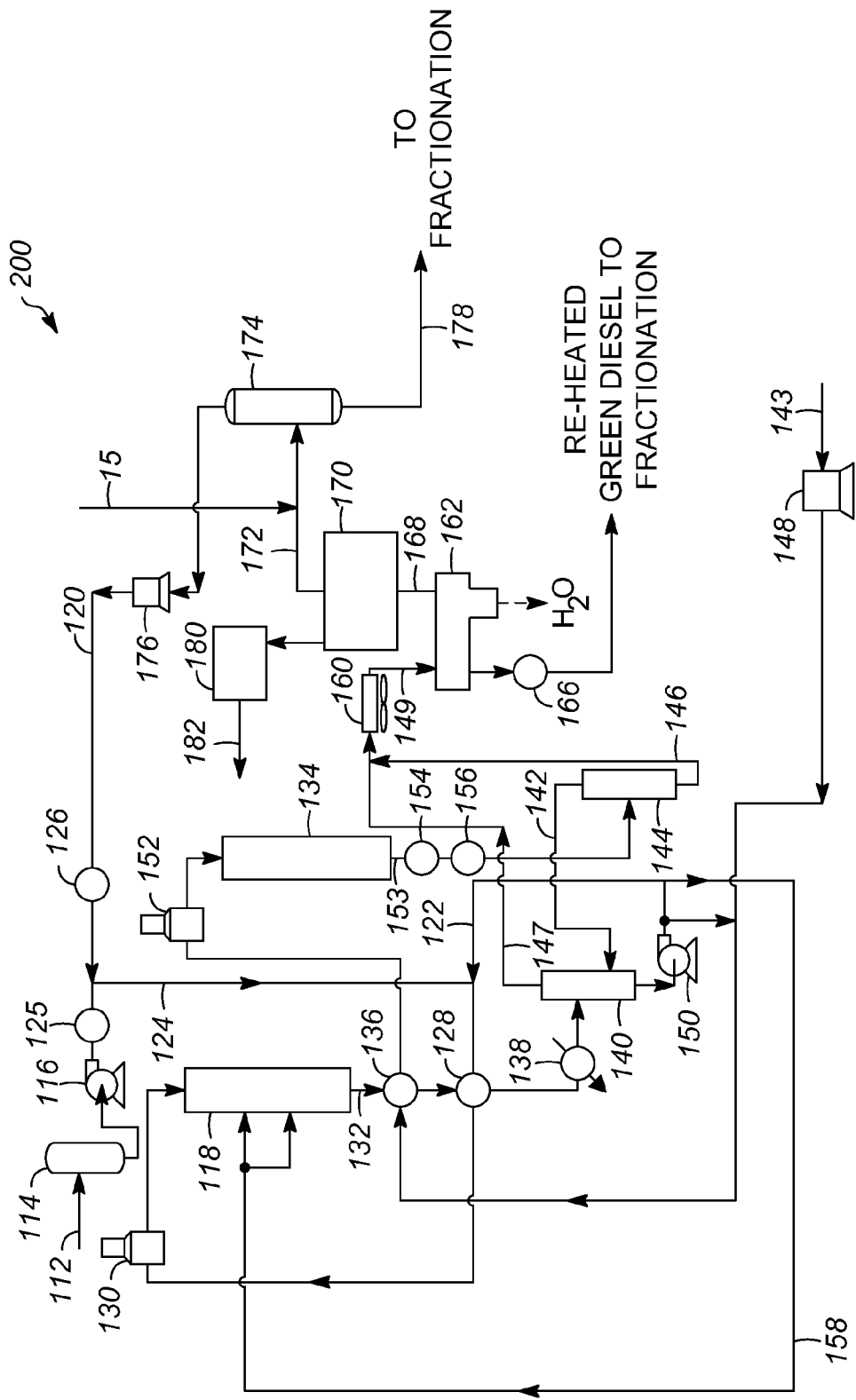
FIG. 3 is a schematic diagram of a system for treating the hydrogen recycle gas in the process for converting the biorenewable feedstock into green diesel fuel, according to another embodiment of the present invention.

The reaction product 132 from the treating reactor comprises a liquid portion and a gaseous portion. The liquid portion comprises a hydrocarbon fraction which is essentially all n-paraffins and has a cetane number of about 100. Although this hydrocarbon fraction is useful as a diesel fuel, because it comprises essentially all n-paraffins, it will have poor cold flow properties. If it is desired to improve the cold flow properties of the liquid hydrocarbon fraction, then the reaction product 132 can be contacted with an isomerization catalyst under isomerization conditions to at least partially isomerize the n-paraffins to isoparaffins, as hereinafter described. Catalysts and conditions for isomerization are well known in the art. Isomerization can be carried out in a separate bed of the same reactor described above or it can be carried out in an isomerization reactor 134 as shown in FIGS. 2 and 3. The reaction product 132 flows to a treating effluent—isom feed exchanger 136 to provide heat to the isomerization reactor inlet stream as hereinafter described.

Before isomerization, the two-phase reaction product 132 may be cooled in a treating effluent steam generator 138, and via a distributor (not shown), enters the top of a downstream enhanced hot separator (EHS) 140, a high pressure stripping column. The liquid phase flows down through the column where it is partially stripped of CO, $CO_2$, $H_2S$ and $H_2O$, which are potential isomerization catalyst poisons, by makeup hydrogen gas 143 which has passed through the isomerization reactor 134 and an isomerization effluent separator 144 (hereinafter "isom effluent separator"), as hereinafter described. The makeup hydrogen gas 143 is compressed in a makeup gas compressor 148. The makeup hydrogen gas 143 enters the enhanced hot separator 140. The vapor 147 and the stripping hydrogen gas exit the top of the enhanced heat separator 140 and flow to a product condenser 160 upstream of a cold separator 162 (or simply "separator"). The vapor is condensed and cooled in the product condenser. The cooled stream 149 enters the cold separator. In the cold separator 162, a liquid water phase is separated from cold liquid product 164, i.e., the green diesel fuel. The cold liquid product 164 is withdrawn from the cold separator and re-heated in a process exchanger 166 on the cold separator outlet stream before being sent to the fractionation unit (referred to in FIGS. 2 and 3 as "re-heated green diesel"). The re-heated cold liquid product acts as internal sponge oil removing a portion of the propane and other light hydrocarbons from the system. The water is withdrawn and sent to a sour water stripper (not shown).

The stripped liquid containing residual $H_2O$, $CO_2$, $H_2S$, and CO collects in the bottom of the enhanced hot separator 140 and flows to the suction of the EHS bottoms pump 150. A portion of the stripped liquid from the EHS bottoms is mixed with the makeup hydrogen gas 143 and flows to the treating effluent—isom feed exchanger 136. It is then further heated with the isomerization feed heater 152 before flowing to the isomerization reactor 134 where at least a portion of the n-paraffins therein are isomerized into iso-paraffins. The remainder of the stripped liquid from the EHS bottoms is split between quench liquid 158 to the reactors, and recycle liquid 122 which mixes with the fresh feedstock 112 and purified recycle gas 120 upstream of the combined feed exchanger 128, then heated in the combined feed exchanger 128 before flowing to the combined feed treating heater 130 before entering the treating reactor for conversion of the feedstock as previously described.

The product stream 153 from the isomerization reactor 134 flows to an isom effluent—stripper feed exchanger 154 followed by an isom effluent—treating feed exchanger 156 before entering the isom effluent separator 144 for separation into product liquid and vapor. The vapor 142 from the isom effluent separator 144 flows to the enhanced hot separator 140.

In one embodiment, illustrated in FIG. 2, a portion of the product liquid 146 (comprising a hydrocarbon fraction, i.e., the green diesel fuel) is withdrawn from the isom effluent separator 144 and sent directly to a fractionation unit for producing co-products without condensing and cooling of the green diesel fuel. As the green diesel fuel from the isom effluent separator is already heated (referred to in FIG. 2 as "hot green diesel"), no re-heating thereof before fractionation is required, thereby saving energy and reducing the required heat exchange area.

Referring now to FIG. 3, in accordance with another exemplary embodiment, the product liquid 146 from the isom effluent separator 144 mixes with vapor 147 from the Enhanced Hot Separator 140 and flows to the product condenser 160 where the mixture is condensed and cooled. A separate water phase is present at temperatures below the water dew point. The cooled stream 149 enters the cold separator 162, where the liquid water phase is separated from cold product liquid. The water is withdrawn and sent to a sour water stripper (not shown). The cold product liquid is withdrawn from the cold separator and re-heated in a process exchanger 166 on the cold separator outlet stream before being sent to the fractionation unit. As noted previously, the cold product liquid acts as internal sponge oil removing a portion of the propane and other light hydrocarbons from the system.

Referring again to FIGS. 2 and 3, a gaseous stream 168 is withdrawn from the cold separator 162. The gaseous stream from the cold separator comprises predominately unreacted hydrogen, dilute $H_2S$, carbon dioxide from the decarboxylation reaction in the treating reactor, and the propane and other light hydrocarbons which are generated during the process. The gaseous portion is treated in a recycle gas scrubber 170 to remove the $CO_2$ to produce the hydrogen recycle gas 172. The carbon dioxide can be removed by means well known in the art such as absorption with an amine, reaction with a hot carbonate solution, pressure swing absorption, etc. The recycle gas scrubber 170 also removes the dilute $H_2S$ from the gaseous stream which may be recovered and then enriched in an acid gas enrichment unit 180 to produce enriched $H_2S$ 182 before further processing in a Claus Unit as known in the art. The $CO_2$ is part of the stream into the acid gas enrichment unit 180.

Referring again to FIG. 1, method 10 continues with providing sponge oil 15 (step 14). The sponge oil comprises kerosene, diesel, naphtha, or the like. In one embodiment, the sponge oil is provided from an external source (not shown), such as from a hydrotreating unit, such as a kerosene hydrotreater, a diesel hydrotreater, a naphtha hydrotreater, or the like, or from a hydrocracker that has hydrotreating as part of the same unit. As used herein, "a hydrotreating process" refers to a refinery process that uses hydrogen to break down sulfur and nitrogen in oils to produce $H_2S$ and ammonia. A "hydrotreating unit" is used to practice the hydrotreating process. The hydrotreating unit is part of a hydrotreating system.

Method 10 further continues by contacting the hydrogen recycle gas with the sponge oil (step 16). The hydrogen recycle gas and sponge oil are contacted in a contact drum 174 downstream of the cold separator 162 and upstream of a hydrogen recycle gas compressor 176. The sponge oil absorbs the propane and other light hydrocarbons from the hydrogen recycle gas. In one embodiment, the sponge oil comprises sour sponge oil. As used herein, "sour sponge oil" means a sponge oil containing $H_2S$. In addition to purifying the hydrogen recycle gas by absorbing the propane and other light hydrocarbons, the sour sponge oil sulfides the deoxygenation catalyst. The sour sponge oil releases $H_2S$ into the hydrogen recycle gas as it absorbs the propane and other light hydrocarbons reaching a new equilibrium. The $H_2S$ becomes part of the purified recycle gas stream. The hydrogen recycle gas and the sponge oil 15 are contacted for an effective contact time such that the mixture achieves equilibrium producing purified recycle gas 120 and propane-rich sponge oil 178. The term "propane-rich sponge oil" refers to sponge oil containing propane and other light hydrocarbons.

The propane-rich sponge oil 178 is sent to a conventional propane fractionation unit (not shown) where the propane and other light hydrocarbons are separated from the propane-rich sponge oil producing propane (and other light hydrocarbons) and propane-free sponge oil. The term "propane-free sponge oil" refers to sponge oil from which substantially all the propane and other light hydrocarbons have been removed. The propane may be recovered. The propane fractionation unit may be integrated into the hydroprocessing systems 100 and/or 200 or may be part of a hydrotreating system, which can be the external source for the sponge oil. The propane-free sponge oil may be recycled for use as the sponge oil. The other light hydrocarbons in the propane-rich sponge oil may be recovered in other existing refinery process units.

Referring again to FIGS. 2 and 3, the purified recycle gas 120 may be heated in a hydrogen recycle gas exchanger 126 before mixing with the fresh feedstock 112 and with recycle liquid 122 (the purified hydrocarbon stream) upstream of the combined feed exchanger 128 to form the combined feed 124 and recycled to the inlet of the treating reactor 118 for processing into the green diesel fuel and possible co-products as previously described and additional hydrogen recycle gas which is treated in accordance with exemplary embodiments as previously described herein. It is to be understood that the systems and operation thereof described herein are exemplary and that other systems and operations are contemplated as being within the scope of the present invention.

Accordingly, a system and a method for treating hydrogen recycle gas have been provided. From the foregoing, it is to be appreciated that the exemplary embodiments of the system and method for treating hydrogen recycle gas provide purified recycle gas that helps convert biorenewable feedstocks into a green diesel fuel, and in one embodiment, also sulfides the catalyst helping to maintain performance of the catalyst. The exemplary embodiments of the system and method also help save energy and reduce the heat exchange area as well as reduce the amount of fresh hydrogen gas required.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for treating hydrogen recycle gas in a process for converting biorenewable feedstock into green diesel fuel, the method comprising the steps of:
 a) hydrotreating and deoxygenating the biorenewable feedstock in a reaction zone containing a catalyst to generate a reaction product;
 b) separating the reaction product into a liquid phase portion and a hydrogen recycle stream; and
 c) contacting the hydrogen recycle gas stream with a sponge oil to generate a purified hydrogen recycle gas stream and a light hydrocarbon-rich sponge oil wherein the source of the sponge oil is internal to the process for converting biorenewable feedstock into green diesel fuel, is external to the process for converting biorenewable feedstock into green diesel fuel, or both.

2. The method of claim 1, wherein the source of the sponge oil is a hydrotreating unit, a fractionation unit in a system for converting biorenewable feedstock into green diesel fuel, or both.

3. The method of claim 1, wherein the sponge oil is a sour sponge oil which releases $H_2S$ into the purified hydrogen recycle stream.

4. The method of claim 3, further comprising passing the purified hydrogen recycle stream to the reaction zone and sulfiding the catalyst.

5. The method of claim 1, further comprising passing the purified hydrogen recycle gas to the reaction zone to convert the biorenewable feedstock into green diesel fuel.

6. The method of claim 1, further comprising fractionating the light hydrocarbon-rich sponge oil into propane and propane-free sponge oil.

7. The method of claim 6, further comprising recovering the propane.

8. The method of claim 6, further comprising recovering and using the propane-free sponge oil as the sponge oil in the contacting step.

9. A method for treating hydrogen recycle gas in a process for converting biorenewable feedstock into green diesel fuel, the method comprising the steps of:
 a) hydrotreating and deoxygenating the biorenewable feedstock in a reaction zone containing a catalyst to generate a reaction product;
 b) separating the reaction product into a liquid phase portion and a hydrogen recycle stream;
 c) removing light hydrocarbons from the hydrogen recycle gas by contacting the hydrogen recycle gas with a sponge oil, the light hydrocarbons being absorbed in the sponge oil to produce purified recycle gas and propane-rich sponge oil, wherein the source of the sponge oil is internal to the process for converting biorenewable feedstock into green diesel fuel, is external to the process for converting biorenewable feedstock into green diesel fuel, or both;
 d) separating the light hydrocarbons from the propane-rich sponge oil; and
 e) recovering the light hydrocarbons.

10. The method of claim 9, further comprising the step of using the purified recycle gas to convert the biorenewable feedstock into the green diesel fuel.

11. The method of claim 9, wherein the step of removing light hydrocarbons comprises contacting the hydrogen recycle gas with a sponge oil comprising a sour sponge oil.

12. The method of claim 9, wherein the step of separating the light hydrocarbons comprises producing propane-free sponge oil, the method further comprising using the propane-free sponge oil as the sponge oil.

13. The method of claim 9, wherein the step of removing the light hydrocarbons comprises removing in a contact drum.

14. The method of claim 9, wherein the step of removing comprises providing the sponge oil from a fractionation unit in a hydrotreating system, in a hydroprocessing system, or both.

15. The method of claim 14, wherein the step of removing comprises providing the sponge oil from the fractionation unit in the same hydroprocessing system used to produce the green diesel fuel.

* * * * *